United States Patent Office 2,947,708
Patented Aug. 2, 1960

2,947,708

METHOD FOR MANUFACTURING A CATALYST COMPRISING A COGELLED COMPOSITE OF SILICA AND MAGNESIA

Robert C. Wilson, Jr., Woodbury, N.J., assignor to Socony Mobil Oil Company, Inc., a corporation of New York No Drawing. Filed Apr. 8, 1957, Ser. No. 651,178

3 Claims. (Cl. 252—452)

This invention relates to a process for the preparation of catalytic and adsorbent materials and more particularly to a method for the preparation of catalysts comprising a homogeneous cogel of silica and an oxide of a divalent metal.

Synthetic porous solids comprising silica and one or more metallic oxides have been used in recent years for the treatment and particularly conversion of petroleum oils because of their catalytic properties. In the conversion of these mineral oils, the catalytic properties depend on the particular metal oxide combined with the silica and are strongly influenced by the method of preparation and treatment of the catalysts during their manufacture. One widely used synthetic catalyst consists essentially of a homogeneous cogel of silica and alumina. Comparable homogeneous cogels of silica and divalent metal oxides have, on the other hand, not been commercially attainable despite their recognized catalytic properties. The process of the present invention now affords a method for producing such homogeneous cogels. Representative of the divalent metals, the oxides of which are cogelled with silica in accordance with the instant process, are those of groups IB, II, and VII of the periodic system. The process described herein is particularly useful in the preparation of homogeneous cogelled composites of silica and magnesia.

Composites of silica and divalent metal oxides have heretofore been used in catalytic reforming of petroleum hydrocarbons boiling in the gasoline range to improve the anti-knock characteristics thereof, in promoting alkylation, isomerization, polymerization, and desulfurization of hydrocarbons, as well as in the treatment of various other compounds, for example, in catalyzing the dehydration of alcohols. Silica-magnesia catalysts are especially useful in promoting the cracking of higher boiling oils to yield gasoline since a better product distribution is thereby attained as compared with that obtainable with the use of other conventional cracking catalysts. The product distribution achieved with silica-magnesia catalysts is desirable in affording higher gasoline yields and lower production of coke and gaseous products.

Silica-magnesia catalysts, as well as catalysts of silica and other divalent metal oxides, have heretofore been prepared by various methods. One process has involved preparation of a silica hydrogel by acidification of an alkali metal silicate. The hydrogel is thereafter water-washed and mixed with an aqueous slurry of magnesia by passage of the mixture through a ball mill, colloid mill, or similar apparatus, after which the resulting composite is aged, dried, and calcined. Another process which has been used involves impregnation of a preformed silica hydrogel with a divalent metal salt and treatment of the impregnated hydrogel with ammonia to precipitate the metal oxide. Still another method for producing silica-divalent metal oxide composites, such as silica-magnesia, has involved adding magnesia as a slurry in water to an acidic silica hydrosol, allowing the resulting sol to set to a hydrogel, followed by water-washing, drying, and calcining of the hydrogel.

These known methods for preparing silica-divalent metal oxide catalytic composites have been cumbersome, time-consuming, wasteful of initial reagents, and, further, often lead to products having poor heat stability and poor mechanical strength. In addition, none of the aforementioned processes have resulted in the production of a true homogeneous hydrogel but, rather, the products obtained in accordance with such previous processes have been either gelatinous precipitates or heterogeneous hydrogels comprising silica having finely divided metal oxide dispersed therein.

It is a major object of this invention to overcome the aforesaid disadvantages accompanying previously employed methods for preparing catalysts of silica and a divalent metal oxide. A further object is the provision of an efficient process for producing a true homogeneous hydrogel consisting essentially of silica and a divalent metal oxide. A still further object is to provide a method for preparing hydrosols of silica and a divalent metal oxide characterized by a short time of gelation and capable of being readily prepared in the form of spheroidal hydrogel particles.

The above and other objects which will be apparent to those skilled in the art are achieved in accordance with the process of the present invention. It is well known that when an aqueous solution of a water-soluble divalent metal salt, for example, a magnesium salt, is mixed with a solution of alkali metal silicate, an irreversible gelatinous precipitate is formed. It has now been discovered that, by providing a carefully controlled quantity of acid in the reactant solutions, a true homogeneous hydrosol, rather than a gelatinous precipitate, can be formed. More specifically, it has been found that, by maintaining an amount of acid in the reaction mixture of alkali metal silicate and divalent metal salt such that the pH thereof is less than about 1, a true homogeneous hydrosol consisting of silica and a divalent metal oxide capable of setting to a true homogeneous hydrogel is obtained. Moreover, it has been established that, within the range of hydrogel formation, an increase in the amount of acid decreases the time of gelation. Since, under the specified conditions of high acidity employed, a large change in the amount of acid present has only a small effect on pH, it is preferred to express the acidity of the reaction mixture in terms of the ratio of gram ions of acid to gram moles of alkali metal oxide contained in said mixture. Thus, it has been found, in accordance with the present invention, that, in order to achieve true hydrogel formation, a controlled amount of acid should be present in the reaction mixture of alkali metal silicate and water-soluble salt of divalent metal such that the ratio of gram ions of acid to gram moles of alkali metal oxide exceeds about 3 and generally is within the approximate range of 6 to 30. It may be noted that washing of the resulting hydrogel of silica and divalent metal oxide with water tends to cause dissolution of the same. Such dissolution can be obviated by treatment of the freshly formed hydrogel with an alkaline solution, such as ammonium hydroxide, to effect substantial neutralization thereof prior to bringing the hydrogel into contact with water. The hydrogel so treated is thereafter desirably water-washed substantially free of soluble matter, dried and activated by heating to an elevated temperature in the approximate range of 850° F. to 1400° F.

The process of this invention may be carried out on a batch, semi-batch, or continuous basis. Thus, the hydrosol formed upon contacting the reactant solutions may be conducted into setting tubs or trays and allowed to remain therein for a sufficient time to effect gelation, after which the resulting hydrogel is removed and broken up into pieces of desired size. Where the gel is desired for adsorbent or other non-catalytic use, the hydrogel after formation may be directly dried to a product of low moisture content. However, where the gel is to be used as a catalyst, it is generally essential to wash the freshly formed hydrogel free of water-soluble matter and to thereafter dry and calcine at an elevated temperature. As noted above, direct contact of the freshly formed hydrogel with water results in some dissolution. Accordingly, it is preferred to substantially neutralize the freshly formed acidic hydrogel by treatment with an aqueous alkaline solution prior to subjecting the same to the water-washing step. After washing, the hydrogel is dried and activated for use as a catalyst.

The instant process has been found to be particularly useful for the production of cogelled catalyst in the form of spheroidal bead-like particles or in the form of microspheres. Thus, the hydrosol produced in accordance with this invention may be formed into spheroidal particles by any feasible process such as the methods described in patents to Marisic, for example, U.S. 2,384,946. Broadly, such methods involve flowing the hydrosol over a dividing cone to separate the same into a plurality of streams, and admitting each of said streams into a column of water-immiscible liquid, for example, an oil medium wherein the globules of hydrosol set to hydrogel and are subsequently passed into an underlying aqueous alkaline solution from which they are sluiced to further processing operations, such as hydrothermal treatment, water-washing, drying, and calcining. Catalysts in the form of microspheres useful in fluidized operations may be made by various procedures such as by spraying the silica-divalent metal oxide hydrosol into hot gases under suitable conditions to dry the droplets to silica-divalent metal oxide microspheres or by dispersing the silica-divalent metal oxide hydrosol in a liquid slightly miscible with water such as n-butanol and the like so that partial dehydration of the droplets takes place, causing gelation.

The process of the invention is particularly valuable in producing cogelled silica-magnesia catalyst in bead form since it has proved very difficult to obtain a commerically acceptable silica-magnesia bead catalyst capable of being used in moving bed or fixed bed catalytic cracking operations. Previous attempts to produce such catalysts have resulted in composites having low activity due to low magnesia content and have been so relatively dense and fine-pored that they have accentuated the problem of regenerability. The manufacture of bead-form silica-magnesia catalyst has presented the particular problem of incorporating sufficient magnesia into the composition for acceptable activity in cracking reaction. About 20 to about 40 weight percent magnesia based on the dry weight of the finished catalyst is required and at these levels, the physical structure of the catalyst has proved especially weak so that previous attempts to form beads of silica-magnesia have resulted in almost 100 percent fracture on drying. Unlike the situation presented in manufacturing silica-alumina catalysts in bead form, it is difficult to have the necessary quantity of magnesium ion in solution and still attain a sufficiently rapid gelation to allow bead formation, since ordinarily a very short gelation time is required. In the case of silica-alumina catalysts, the incorporation of the requisite quantity of aluminum ion does not result in this problem.

The relative amounts of silica and divalent metal oxide contained in the catalysts produced in accordance with the present invention may be varied widely. Generally, however, silica will be present in major proportion and the metal oxide content will ordinarily be between about 1 and about 45 percent by weight, depending largely upon the particular metal oxide involved and the intended use of the resultant cogelled composite. Thus, it has heretofore been recognized where silica-magnesia composites are to be employed in catalytically promoting the cracking of higher boiling oils to materials boiling in the range of gasoline that the magnesia content of the composite should preferably be between about 20 and about 40 percent by weight. Generally, optimum catalytic activity has been observed with a catalyst containing about 30 percent by weight of magnesia. Accordingly, while the content of magnesia in the cogelled silica-magnesia composites prepared in accordance with the method of the present invention may be varied widely, it is contemplated that the magnesia content thereof will generally be between about 20 and about 40 percent by weight.

The divalent metal compound used in the present process may be any suitable water-soluble divalent metal salt. Representative of the oxides which may be cogelled with silica under the conditions of the present process are those of the metals of groups IB, II, and VII of the periodic system. The oxides of magnesium, cadmium, zinc, copper, manganese, and mercury are typical of those which may be cogelled with silica in accordance with the method of the invention. Salts employed include water-soluble chlorides, sulfates, nitrates, acetates, borates, formates, bromides, iodides, etc., of the particular divalent metal which it is desired to cogel with silica. Thus, taking magnesium as a typical example, magnesium chloride, magnesium sulfate, magnesium nitrate, magnesium iodide, magnesium bromide, magnesium acetate, magnesium borate, magnesium formate, etc., may be used. Of this group, magnesium chloride and magnesium sulfate are preferred because of their low cost and availability. It is also contemplated that two or more divalent metal oxides or a combination of a divalent metal oxide with other metal oxide may be cogelled with silica under the conditions of high specified acidity in accordance with the process of the invention. Thus, where it is desired to form a silica-alumina-magnesia cogel, the metal salt reactants will suitably comprise a water-soluble salt of magnesium and a water-soluble salt of aluminum such as aluminum nitrate or aluminum sulfate. Likewise, where it is desired to incorporate chromic oxide in the silica-divalent metal oxide hydrosol, a solution of ammonium dichromate or chromic nitrate may be used; when molybdenum oxide is the desired added catalytic component, a solution of ammonium molybdate may be used; similarly ferric oxide may be added by using a solution of ferric nitrate. It is to be understood, of course, that the above are merely representative and non-limiting examples of the components and solutions which may be used. If desired, the resultant dried homogeneous cogel of silica and divalent metal oxide produced in accordance with the instant process may be impregnated with various catalytic components.

In carrying out the process, commercially available alkali metal silicates having a mole ratio of $Na_2O:SiO_2$ or $K_2O:SiO_2$ of 1:1 to 1:4 may be used. The silicates may be used in aqueous solution of desired concentration and the ratio of $Na_2O:SiO_2$ or $K_2O:SiO_2$ may be adjusted by the addition of suitable quantities of NaOH or KOH. Commercial sodium silicate, such as "N" brand silicate, having a ratio of $Na_2O:SiO_2$ of 1:3.22 and a Baumé gravity of 41° has been found satisfactory for use. Alkali metal silicates produced by the treatment of silica or other highly siliceous minerals with alkali metal hydroxides, oxides, peroxides, or carbonates may be used. For example, materials containing alkali metal silicates produced by using fuller's earth, bentonite, or other naturally occurring silicates with an alkali metal carbonate, or by treating such naturally occurring silicates with an alkali metal hydroxide solution at elevated temperatures, may be satisfactorily used in the present process.

The acid employed in the present process may be any water-soluble acid, including both inorganic and organic acids. Generally, a readily available and relatively inexpensive acid will be employed, such as acetic acid, or a mineral acid, such as nitric, sulfuric, or hydrochloric acid.

The process of the invention is carried out by intimately mixing an aqueous solution of an alkali metal silicate with an aqueous solution of a water-soluble salt of magnesium or other suitable divalent metal in the presence of a controlled amount of acid such that the ratio of gram ions of acid to gram moles of alkali metal oxide in the mixture is greater than 3 and generally is within the approximate range of 6 to 30, whereby a hydrosol of silica and metal oxide is obtained. The resulting hydrosol sets to a hydrogel after lapse of a suitable period of time without addition to or subtraction from said sol of any material. The hydrogel so obtained is thereafter treated with an aqueous alkaline solution, such as ammonium hydroxide, to substantially neutralize the same and the treated hydrogel is then washed with water until free of soluble matter.

After water-washing, the catalyst is preferably dried at a temperature generally in the range of about 150° F. to about 400° F. in an air or steam atmosphere and thereafter activated by heating to a temperature in the approximate range of 850° F. to 1400° F. for a period of about 1 hour or more.

The following three comparative examples will serve to illustrate the need for a controlled amount of acid in the reaction mixture in order to achieve true hydrogel formation and also show that an increase in the amount of acid decreases the time of gelation.

EXAMPLE 1

The following reactant solutions were employed:

Solution A:
780 grams of "N" brand sodium silicate containing 8.9% by weight $Na_2O$ and 28.8% by weight $SiO_2$.
820 grams of distilled water.

Solution B:
288 grams of magnesium sulfate.
2112 grams of distilled water.

Two hundred grams of Solution A were added to 300 grams of Solution B with vigorous agitation. A precipitate formed instantaneously and settled from the supernatant liquor; the pH was 8.7.

EXAMPLE 2

The following reactant solutions were employed:

Solution A:
780 grams of "N" brand sodium silicate containing 8.9% by weight $Na_2O$ and 28.8% by weight $SiO_2$.
820 grams of distilled water.

Solution B:
36 grams magnesium sulfate.
209.8 grams distilled water.
54.6 grams 97% sulfuric acid.

One hundred ninety-nine and six tenths grams of Solution A were added to 300.4 grams of Solution B with vigorous agitation. A clear precipitate-free hydrosol formed. The hydrosol set to a firm all-embracing hydrogel in 5 hours, the indicated pH being 0.3.

EXAMPLE 3

The following reactant solutions were employed:

Solution A:
780 grams of "N" brand sodium silicate containing 8.9% by weight $Na_2O$ and 28.8% by weight $SiO_2$.
820 grams of distilled water.

Solution B:
36 grams magnesium sulfate.
154.8 grams distilled water.
109.6 grams 97% sulfuric acid.

One hundred ninety-nine and six tenths grams of Solution A were added to 300.4 grams of Solution B with vigorous agitation. A clear precipitate-free hydrosol formed. The hydrosol set to a firm all-embracing hydrogel in 10 minutes, the indicated pH being 0.0.

It will be seen from the foregoing examples that under alkaline reaction conditions (Example 1), a silica-magnesia gelatinous precipitate rather than a true homogeneous hydrogel resulted, while under conditions of high acidity the desired silica-magnesia hydrogel was obtained. It will further be seen that increasing the ratio of gram ions of acid to gram moles of alkali metal oxide from 3.9/1 to 7.8/1, other conditions remaining constant, caused the time of gelation of the silica-magnesia hydrosol obtained to decrease from 5 hours to 10 minutes.

The results of the above examples and other examples carried out in a similar manner showing the effect of the ratio of gram ions of acid to gram moles of alkali metal oxide on the nature of the product obtained and on the time of gelation are set forth in Table I below:

*Table I*

| Example [1] | $H_2SO_4/Na_2O$, Mole Ratio | Gel Time | pH |
|---|---|---|---|
| 1 | 0 | Instantaneous precipitate | 8.7 |
| 4 | 1.9 | do | 0.8 |
| 5 | 2.6 | do | 0.4 |
| 6 | 3.2 | 21 hours | |
| 2 | 3.9 | 5 hours | 0.3 |
| 7 | 5.8 | 38 minutes | 0.2 |
| 3 | 7.8 | 10 minutes | 0.0 |
| 8 | 10.4 | 1.2 minutes | |

[1] In the above examples:

Product Concentration (P.C.) = $\frac{\text{Wt. SiO}_2 + \text{Wt. MgO}}{\text{Total Wt. of Reactants}} \times 100 = 8.0$ MgO Content = $\frac{\text{Wt. MgO}}{\text{Wt. MgO} + \text{Wt. SiO}_2} \times 100 = 30.0\%$ Wt. Temperature of reactants = 58–63° F.

The data in the above table show that, unlike silica gel or silica-alumina gel, a silica-magnesia hydrogel can be formed only at a very high acidity.

The results of other examples carried out similar to those described above and set forth in Table II below show that other acids and other salts of magnesium may be used, providing the acidity of the reaction mixture is sufficiently high, i.e., the acid to alkali metal oxide mole ratio is greater than about 3. The results of Table II also show that true homogeneous hydrogels of silica and other divalent metals can be obtained, utilizing this high acidity technique.

Table II

| Example | Type of Gel | Salt | Acid | Base | Acid/Na$_2$O, Mole Ratio | P.C., Percent Wt. | Metal Oxide Name | Metal Oxide Percent Wt. | Gel Time |
|---|---|---|---|---|---|---|---|---|---|
| 9 | Silica-Magnesia | Mg(NO$_3$)$_2$·6H$_2$O | HNO$_3$ | Na$_2$SiO$_3$ | 15.6 | 6.0 | MgO | 30.0 | 32 Min. |
| 10 | do | Mg(NO$_3$)$_2$·6H$_2$O | None | Na$_2$SiO$_3$ | 0.0 | 6.0 | MgO | 30.0 | Instantaneous Precipitate. |
| 11 | do | Mg(C$_2$H$_3$O$_2$)$_2$·4H$_2$O | CH$_3$COOH | Na$_2$SiO$_3$ | 15.6 | 6.0 | MgO | 30.0 | 230 Min. |
| 12 | do | Mg(C$_2$H$_3$O$_2$)$_2$·4H$_2$O | None | Na$_2$SiO$_3$ | 0.0 | 6.0 | MgO | 30.0 | Instantaneous Precipitate. |
| 13 | Silica-Zinc Oxide | ZnSO$_4$·H$_2$O | H$_2$SO$_4$ | Na$_2$SiO$_3$ | 7.8 | 8.0 | ZnO | 30.0 | 11 Min. |
| 14 | do | ZnSO$_4$·H$_2$O | None | Na$_2$SiO$_3$ | 0.0 | 8.0 | ZnO | 30.0 | Instantaneous Precipitate. |
| 15 | Silica-Cadmium Oxide | 3CdSO$_4$·8H$_2$O | H$_2$SO$_4$ | Na$_2$SiO$_3$ | 7.8 | 8.0 | CdO | 30.0 | 20 Min. |
| 16 | do | 3CdSO$_4$·8H$_2$O | None | Na$_2$SiO$_3$ | 0.0 | 8.0 | CdO | 30.0 | Instantaneous Precipitate. |
| 17 | Silica-Copper Oxide | CuSO$_4$·5H$_2$O | H$_2$SO$_4$ | Na$_2$SiO$_3$ | 7.8 | 8.0 | CuO | 30.0 | 4 Min. |
| 18 | do | CuSO$_4$·5H$_2$O | None | Na$_2$SiO$_3$ | 0.0 | 8.0 | CuO | 30.0 | Instantaneous Precipitate. |
| 19 | Silica-Manganese Oxide | MnSO$_4$·H$_2$O | H$_2$SO$_4$ | Na$_2$SiO$_3$ | 7.8 | 8.0 | MnO | 30.0 | 8 Min. |
| 20 | do | MnSO$_4$·H$_2$O | None | Na$_2$SiO$_3$ | 0.0 | 8.0 | MnO | 30.0 | Instantaneous Precipitate. |

The effect of product concentration on gel time of the silica-magnesia hydrogels obtained in accordance with the present invention is shown in Table III below:

Table III

| Example[1] | P.C., Percent Wt. | Gel Time |
|---|---|---|
| 21 | 2.0 | Sol did not gel in 68 hours. |
| 22 | 4.0 | >11 hours. |
| 23 | 6.0 | 105 minutes. |
| 3 | 8.0 | 10 minutes. |
| 24 | 9.2 | 4.5 minutes. |
| 25 | 9.4 | 4.0 minutes. |
| 26 | 9.8 | 3.1 minutes. |

[1] In above examples:
H$_2$SO$_4$/Na$_2$O Mole Ratio =7.7 to 7.8.
MgO Content=30.0% Wt.
Temperature of reactants=58–63° F.

The effect of magnesia content on time of gelation is shown in Table IV:

Table IV

| Example[1] | MgO Content Percent Wt. | Gel Time, minutes |
|---|---|---|
| 27 | 20 | 3 |
| 3 | 30 | 10 |
| 28 | 40 | 35 |
| 29 | 50 | 50 |

[1] In above examples:
H$_2$SO$_4$/Na$_2$O Mole Ratio =7.7 to 7.8.
P.C.=8.0.
Temperature of reactants=58–63° F.

The effect of temperature of reactants on the time of gelation of silica-magnesia hydrogels produced in accordance with the process of the invention is shown in Table V below:

Table V

| Example[1] | Reactant Temp., ° F. | Gel Time, (minutes) |
|---|---|---|
| 30 | 40 | 19.1 |
| 3 | 63 | 10.0 |
| 31 | 80 | 6.3 |
| 32 | 90 | 5.1 |
| 33 | 100 | 3.5 |
| 34 | 111 | 2.5 |
| 35 | 120 | 1.7 |

[1] In above examples:
H$_2$SO$_4$/Na$_2$O Mole Ratio =7.8.
P.C.=8.0% Wt.
MgO Content=30.0% Wt.

The data of the foregoing tables establish that the time of gelation of the homogeneous cogels of silica and divalent metal oxide obtained by the process of the present invention may be varied widely, thereby permitting the desired composites to be manufactured by the bead or microsphere techniques described hereinabove as well as by older methods which result in granular, extruded or pelleted products.

A comparison of the catalytic cracking characteristics of silica-magnesia cogel and silica-alumina cogel catalysts prepared from highly acidic hydrogels was carried out as follows:

EXAMPLE 36

The following solutions were reacted:

Solution A:
  486.0 grams "N" brand sodium silicate.
  445.0 grams distilled water.
Solution B:
  180.0 grams magnesium sulfate.
  808.5 grams distilled water.
  580.5 grams 96.5% sulfuric acid.

Nine hundred thirty-one grams of Solution A at 73° F. were added to 1569 grams of Solution B at 73° F. with vigorous agitation. The resulting clear hydrosol was poured into a tray where the sol set to a firm all-embracing hydrogel in 8 minutes at a pH of 0.9. The hydrogel was cut into ¾" cubes and treated with 828 milliliters of a solution of 28 percent NH$_4$OH made up to 2 liters with water and having a pH of 11.9. The above treatment with NH$_4$OH was carried out at room temperature with three fresh batches of solution over a period of 24 hours. The gel so treated was then water-washed at a rate of 100 cc./minute for 49 hours until sulfate-free. The washed gel was thereafter dried in an atmosphere of steam and calcined in air at 1300° F.

EXAMPLE 37

The following solutions were reacted:

Solution A:
  646.5 grams "N" brand sodium silicate.
  680.0 grams distilled water.
Solution B:
  87.5 grams Al$_2$(SO$_4$)$_3$·18H$_2$O.
  2.5 grams Cr$_2$(SO$_4$)$_3$·K$_2$SO$_4$·24H$_2$O.
  558.5 grams distilled water.
  525.0 grams 97.2% sulfuric acid.

Thirteen hundred twenty-six and five tenths grams of Solution A at 78° F. were added to 1173.5 grams of Solution B at 79° F. with vigorous agitation. The resulting clear hydrosol was poured into a tray where the sol set to a firm all-embracing hydrogel in 15 minutes at a pH of 0.9. The silica-alumina hydrogel, containing a small amount of chromic oxide was then cut into ¾" cubes and treated with ammonium hydroxide solution, water-washed, dried, and calcined in a manner similar to that of Example 36.

The silica-magnesia and silica-alumina catalysts produced respectively by the process of Examples 36 and 37 were each employed in catalytically cracking a light East Texas gas oil (B.P. 434–685° F.), utilizing a catalyst/oil volume ratio of 4.0, a liquid hourly space velocity of 1.5 and a reaction temperature of 800° F. A comparison of the catalyst properties and catalytic cracking results obtained are shown in Table VI below:

*Table VI*

| Example | 36 | 37 |
|---|---|---|
| Type of Catalyst | Silica-Magnesia | Silica-Alumina |
| Product Concentration, Percent wt | 8.0 | 8.0 |
| Metal Oxide, Percent wt | 30.0 | 6.7 |
| pH of Hydrogel (indicated) | 0.9 | 0.9 |
| Cracking Activity Data: | | |
| Yield, no loss basis— | | |
| Gas, Percent wt | 3.9 | 7.5 |
| Coke, Percent wt | 3.5 | 2.8 |
| 410° F. End Point | 43.3 | 29.3 |
| Gasoline, Percent vol | 53.0 | 62.1 |
| Cycle Stock, Percent vol | | |
| Conversion, Percent vol | 47.0 | 37.9 |
| Efficiency, Percent | 92.1 | 77.4 |
| Gasoline/Gas Ratio | 11.1 | 3.9 |
| Gasoline/Coke Ratio | 12.4 | 10.5 |

The above data definitely establish that when gelation occurs at high acidity, the silica-magnesia cogel catalyst is far superior to silica-alumina cogel catalyst with respect to cracking characteristics.

As noted hereinbefore, other metal oxides may, if desired, be incorporated in the cogelled silica-divalent metal oxide composite. Thus, homogeneous silica-alumina-magnesia hydrogels are readily prepared under the specified high acidity conditions of the invention as will be seen from the following illustrative example:

EXAMPLE 38

The following solutions were reacted:

Solution A:
  97.2 grams "N" brand sodium silicate containing 8.9% wt. $Na_2O$ and 28.8% wt. $SiO_2$.
  99.0 grams distilled water.

Solution B:
  18.0 grams $MgSO_4$.
  39.2 grams $Al_2(SO_4)_3 \cdot 18H_2O$.
  137.5 grams distilled water.
  109.1 grams 96.8% sulfuric acid.

One hundred ninety-six and two tenths grams of Solution A at 100° F. were added to 303.8 grams of Solution B at 105° F. with vigorous agitation. A clear precipitate-free hydrosol was formed at 115° F. The sol set to a firm, all-embracing hydrogel at 113° F. in 6 minutes at a pH of 0, the $H_2SO_4$ to $Na_2O$ mole ratio being 7.7.

It will be understood that the above description is merely illustrative of preferred embodiments of the invention, of which many variations may be made by those skilled in the art without departing from the spirit thereof.

I claim:

1. A process for preparing a homogeneous cogelled catalytic composite consisting essentially of a major proportion of silica and a minor proportion of magnesia, comprising intimately admixing a solution of an alkali metal silicate with a water-soluble salt of magnesium and a controlled amount of an acid such that the ratio of gram ions of acid to gram moles of alkali metal oxide in the mixture is within the approximate range of 6 to 30, whereby a hydrosol of silica and magnesia is obtained, permitting said hydrosol to set to a hydrogel, treating said hydrogel with ammonium hydroxide solution to substantially neutralize the same, water-washing the hydrogel so treated free of water-soluble matter, drying and calcining the resulting cogel.

2. A process for preparing a homogeneous cogelled composite consisting essentially of a major proportion of silica and a minor proportion of magnesia, which comprises intimately admixing a solution of an alkali metal silicate with a water-soluble salt of magnesium and a controlled amount of an acid to yield a hydrosol of silica and magnesia characterized by a pH of less than 1, permitting said hydrosol to set to a hydrogel, substantially neutralizing said hydrogel by contacting the same with an aqueous alkaline solution and water washing the neutralized hydrogel free of water-soluble matter.

3. A process for preparing a homogeneous cogelled composite consisting essentially of a major proportion of silica and a minor proportion of magnesia, which comprises intimately admixing a solution of an alkali metal silicate with a water-soluble salt of magnesium and a controlled amount of an acid such that the ratio of gram ions of acid to gram moles of alkali metal oxide in the mixture is greater than 3, whereby a hydrosol of silica and magnesia is obtained, permitting said hydrosol to set to a hydrogel, treating said hydrogel with an aqueous alkaline solution to substantially neutralize the same, water-washing the hydrogel so treated free of water-soluble matter and drying the resulting cogel.

References Cited in the file of this patent

UNITED STATES PATENTS

| | | |
|---|---|---|
| 1,450,174 | Granichstadten et al. | Apr. 3, 1923 |
| 1,577,186 | Patrick | Mar. 16, 1926 |
| 1,577,190 | Patrick | Mar. 16, 1926 |
| 2,456,721 | Milliken et al. | Dec. 21, 1948 |
| 2,551,015 | Kimberlin et al. | May 1, 1951 |
| 2,645,619 | Hockstra | July 14, 1953 |